United States Patent [19]
Porter

[11] 4,354,398
[45] Oct. 19, 1982

[54] CONTROL MECHANISM FOR HYDRAULIC LOCKING DEVICE

[75] Inventor: Clyde R. Porter, Los Angeles, Calif.

[73] Assignee: P. L. Porter Co., Woodland Hills, Calif.

[21] Appl. No.: 157,356

[22] Filed: Jun. 9, 1980

Related U.S. Application Data

[63] Continuation-in-part of Ser. No. 939,383, Sep. 5, 1978, abandoned.

[51] Int. Cl.³ .............................................. F16C 1/10
[52] U.S. Cl. .................................. 74/501 R; 74/502; 403/155
[58] Field of Search .................. 74/501 R, 501.5, 502; 403/155; 24/211 L

[56] References Cited

U.S. PATENT DOCUMENTS

| 2,240,138 | 4/1941 | Johns | 24/211 L |
| 3,589,209 | 6/1971 | Howell | 74/501 |
| 3,730,019 | 5/1973 | Ballard | 74/502 |
| 4,088,040 | 5/1978 | Rau-Myring | 74/501 R |

FOREIGN PATENT DOCUMENTS 2723869 12/1977 Fed. Rep. of Germany .... 74/501 R

Primary Examiner—Kenneth Dorner
Attorney, Agent, or Firm—Beehler, Pavitt, Siegemund, Jagger & Martella

[57] ABSTRACT

A control mechanism for use with a hydraulic locking device to permit the device to be unlocked under control of an operator. The control mechanism includes a lever assembly fastened to the piston rod of the hydraulic control device and connected by a cable to a remotely located push button assembly. When the operator presses the push button, the cable is drawn causing the lever assembly to move an operating rod of the hydraulic locking device to a release position thereby unlocking the device. The lever assembly can be installed on the hydraulic locking device without the use of tools by sliding a spring clip which is a non-removable portion of the lever assembly. A threaded collar permits the effective length of the conduit to be altered to adjust the stroke of the mechanism. The spring cip is made to serve a dual purpose. When the spring clip has been shifted to the position in which it secures the lever assembly to the hydraulic locking device, the spring clip in that position also locks the threaded collar from rotating. When the spring clip has been shifted to its other position, the threaded collar may be rotated.

1 Claim, 3 Drawing Figures

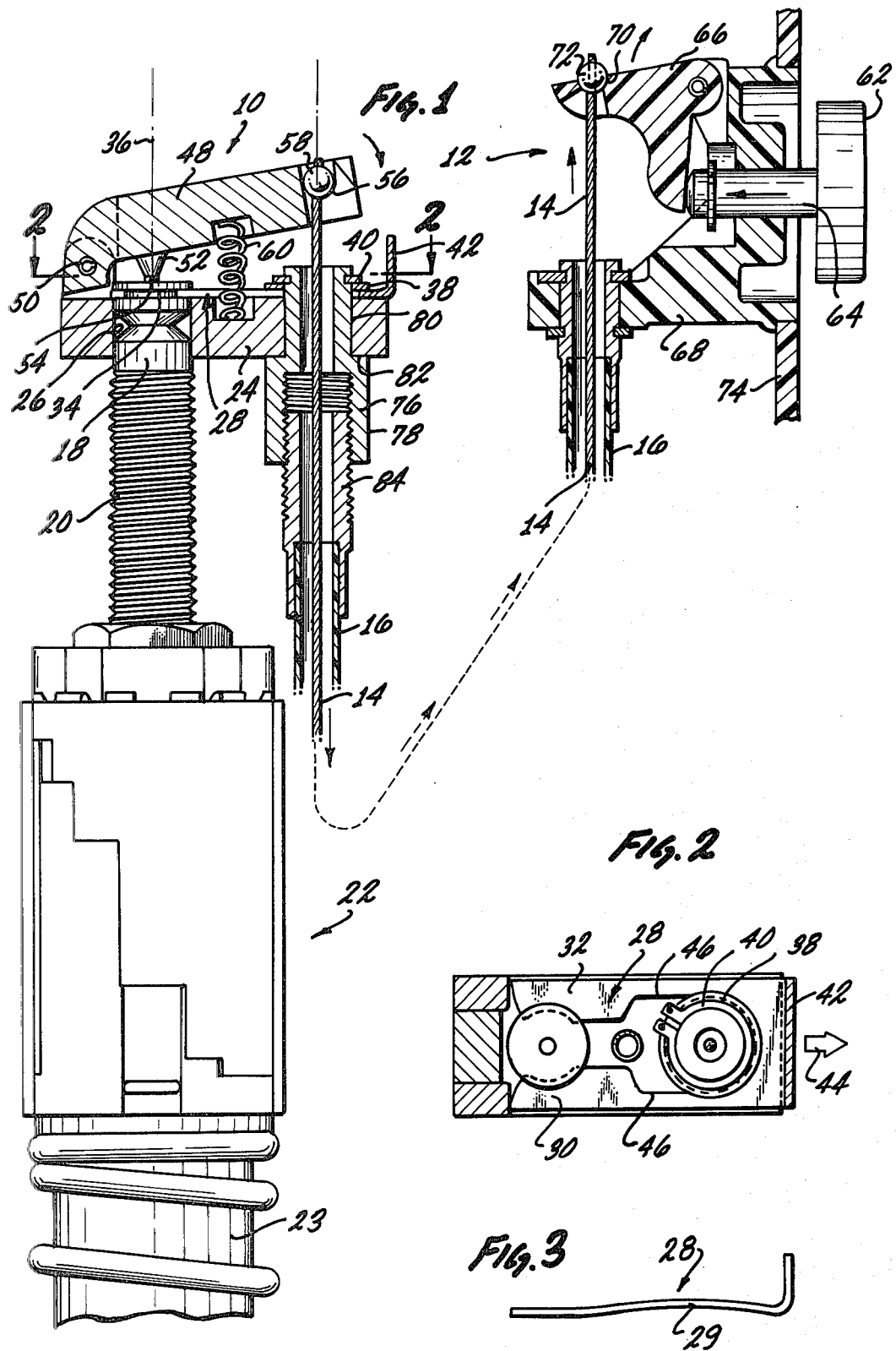

CONTROL MECHANISM FOR HYDRAULIC LOCKING DEVICE

BACKGROUND OF THE INVENTION

This application is a continuation-in-part of U.S. application Ser. No. 939,383, filed Sept. 5, 1978 for a Control Mechanism for Hydraulic Locking Device and now abandoned. The priority date of Sept. 5, 1978 is claimed for the subject matter in this application that is common to the earlier-filed application.

The present invention is in the field of hydraulic locking devices and more specifically is a control mechanism which can be used by an operator to release the hydraulic locking device.

Hydraulic locking devices are widely used to control the spacing between two members. In one exemplary application, the hydraulic locking device is used for controlling the inclination of a tiltable backrest of a reclining seat in aircraft and other vehicles. This use of the device is described in U.S. Pat. No. 2,522,246 for RECLINING CHAIR, issued to Armstrong Sept. 12, 1950.

Typically such hydraulic locking devices include a hydraulic cylinder connected to one of the members, a hollow piston rod extending through one end of the hydraulic cylinder and connected to the other of the two members, and an operating rod extending coaxially within the hollow piston rod and protruding beyond the exposed end of the piston rod, and operative when pushed into the piston rod to a release position to release the hydraulic locking device so it can be reset to alter the separation between the two members.

Contemporary locking devices are disclosed in U.S. Pat. No. 3,760,911 for HYDRAULIC LOCKING DEVICE, issued to Porter et al. Sept. 25, 1973 and in U.S. Pat. No. 3,860,098 for HYDRAULIC LOCKING DEVICE, issued to Porter et al. Jan. 14, 1975. The devices described in these patents are sold under the name HYDROLOK, a registered trademark of the P. L. Porter Company of Woodland Hills, Calif., to whom the aforementioned patents have been assigned. The subject matter disclosed in the above patents is hereby incorporated into the present disclosure by reference.

A hydraulic control assembly is disclosed in U.S. Pat. No. 3,553,967 for HYDRAULIC CONTROL ASSEMBLY issued to Porter et al. Jan. 12, 1971 and in U.S. reissue Pat. No. Re. 28,030 for HYDRAULIC CONTROL ASSEMBLY to Porter et al., issued June 4, 1974. The hydraulic control assembly disclosed in these patents includes a push button operable by a passenger in a vehicle to release the hydraulic locking device so that he can adjust the tilt of the back of his seat. The push button includes a plunger which presses against a diaphragm to cause a hydraulic pressure, which pressure is then transmitted through a tube to a movable wall or diaphragm which controls the release of the locking device. In contrast to the hydraulic control assembly, the present invention relates to a mechanical control assembly in which the forces are transmitted by a cable instead of through a tube filled with hydraulic fluid.

The present invention thus relates to a control mechanism which attaches to the locking device to permit an operator to trip the release mechanism of the hydraulic locking device from a remote and more comfortable position. The hydraulic locking device per se is not the subject of the present invention, but only the control mechanism.

Because the hydraulic locking devices are frequently used to control the tilt of the back of the seat in a vehicle, the hydraulic locking device is normally positioned under the seat to prevent tampering and for aesthetic reasons. Accordingly, the control mechanism must be rugged and reliable, easy to mount to the hydraulic locking device, and easy to adjust. It is desirable that the placement and adjustment of the control mechanism should be accomplished without removing the hydraulic locking deivce from the seat and without removing the seat from service for more than a minimal amount of time.

These desiderata were not fulfilled by control mechanisms known to the prior art. Typically, such control mechanisms were attached to the piston rod of the hydraulic locking device by socket set screws, and it was necessary for the person installing or replacing the control mechanism to carry the proper size wrench for use with the set screws. Further, the socket set screws were difficult to see and to adjust in the dark and crowded surroundings where the device was used. For the same reasons, it was difficult in prior art devices to adjust the end points of the stroke of the cable; i.e., to trim the cable to the proper length relative to the length of the conduit through which the cable passes. In some prior art control mechanisms, the cable was crimped between portions of the control mechanism so that the end of the cable could not be readily disconnected from the control mechanism even when the cable had been cut. This, in turn, meant that replacement of a worn cable would require replacement of the entire control mechanism.

Thus, control mechanisms known in the prior art tended to be difficult to install and inconvenient to adjust.

SUMMARY OF THE INVENTION

The control mechanism of the present invention incorporates a number of features designed to overcome the difficulties inherent in the prior art control mechanisms.

No tools are required to attach the control mechanism to the piston rod of the hydraulic locking device. In accordance with a preferred embodiment of the present invention, the control mechanism is attached to the end of the piston rod by a spring clip which engages a circumferential groove near the end of the piston rod. The control mechanism of the present invention is attached simply by inserting the tip of the piston rod through a hole in the control mechanism, and sliding the spring clip to a position where it engages the circumferential groove to retain the control mechanism on the piston rod. This mode of mounting the control mechanism to the piston rod has the further advantage that the control mechanism can rotate about the axis of the piston rod, permitting it to be installed in a convenient orientation and thereafter rotated to a different position for use. Also, it is not necessary to rotate the control mechanism to any particular position around the piston rod when installing it, as would be required if it were keyed to the piston rod. The spring clip is secured to the control mechanism with respect to which it slides, and therefore the spring clip cannot fall off in use or become misplaced during installation or servicing.

The portion of the control mechanism which is attached to the piston rod will be referred to below as the lever assembly.

In a preferred embodiment, the lever assembly is actuated by a cable which is drawn through a conduit under control of an operator. The operator is provided with a push button assembly which includes a crank which draws the cable through the conduit when a push button is pressed. The proximal end of the cable engages the lever assembly and the distal end of the cable engages the crank. In both instances, a metallic ball or bead is threaded onto the cable at each end and crimped in place. The larger size of the balls prevents them from being pulled through the sockets upon which they bear, thereby securing the cable at its ends to the lever assembly and to the crank respectively.

The parts on which the balls bear pivot when the push button is pressed, and if the cable were merely clamped to the pivoting parts, the cable would be subjected to flexing as the parts pivot. In accordance with the present invention, this flexing of the cable is avoided, thereby increasing the life of the cable and eliminating the stresses which would result if the relatively thick cable were clamped to the pivoting parts.

In the present invention, the push button assembly is mounted on the conduit through which the cable slides. The length of the cable, as defined by the balls which have been swaged to it, must be such that the range of movement of the end of the cable at the push button is within the range of movement of the crank portion of the push button. However, in accordance with the present invention, it is not necessary to determine the length of the cable with great precision, because in the present invention the length of the conduit is adjustable. A threaded sleeve connects the conduit to the control mechanism, and the length of the conduit is adjusted by manually rotating the threaded sleeve.

In a preferred embodiment, the threaded sleeve is inserted through a bore on the lever assembly so that the inserted end of the threaded sleeve protrudes beyond the shoulder adjacent the bore. A snap ring applied to this end of the threaded sleeve prevents the threaded sleeve from being withdrawn from the bore, but does not prevent rotation of the threaded sleeve within the bore.

In a preferred embodiment the snap ring that secures the threaded sleeve to the lever assembly is spaced from the shoulder adjacent the bore by a slotted portion of the spring clip that is used to secure the lever assembly to the piston rod. In this embodiment, the spring clip in its unmounted condition is arched. Sliding the spring clip to the position where it secures the lever assembly to the piston rod results in the arched portion of the spring clip being moved to a position between the snap ring and the shoulder adjacent the bore. At this position, the snap ring is bearing against the arched portion of the spring clip, attempting to flatten it. The elastic restoring forces in the spring clip exert a relatively large force on the snap ring, attempting to draw the threaded sleeve through the bore. However, a shoulder on the threaded sleeve bears against the lever assembly to limit how far the threaded sleeve can extend into the bore.

In a preferred embodiment of the present invention, the threaded sleeve is connected to the lever assembly by means of a snap ring which prevents the threaded sleeve from coming loose from the lever assembly but which permits the sleeve to be rotated to adjust the length of the conduit.

In a preferred embodiment of the present invention, the lever assembly includes a mount which is fastened to the end of the piston rod of the hydraulic locking device by the snap fastener discussed above, and further includes and output lever pivotally mounted to the mount and engaged by the ball at the end of the cable so that when the cable is drawn through the conduit as the push button is pressed, the output lever is pivoted and in so doing, the output lever pushes the operating rod into the piston rod releasing the hydraulic locking device. A compression spring positioned between the output lever and the mount returns the output lever to its original position when the push button is released.

The novel features which are believed to be characteristic of the invention both as to its structure and its operation, along with further objects and advantages thereof, will be better understood from the following description considered in connection with the accompanying drawings, in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a cross-sectional view of a preferred embodiment of the control mechanism of the present invention; and, FIG. 2 is a cross-sectional view in the direction 2—2 indicated in FIG. 1; and, FIG. 3 is a side elevation view of the spring clip used in a preferred embodiment of the invention.

DETAILED DESCRIPTION OF THE PREFERRED EMBODIMENT

In a preferred embodiment of the present invention, the control mechanism includes a lever assembly 10 and a push button assembly 12. The push button assembly is connected to the lever assembly 10 by a cable 14 which extends through a conduit 16. The end of the conduit that is connected to the lever assembly is referred to as the proximal end, while the end that is connected to the push button assembly is referred to as the distal end. The lever assembly 10 is attached to the end portion 18 of the piston rod 20 of the hydraulic locking device 22, which includes a hydraulic cylinder 23.

The lever assembly 10 includes a mount 24 which includes a hole 26. The end portion 18 of the piston rod 20 is inserted through the hole 26, and the mount 24 is fastened to the piston rod 20 by a spring clip 28 also shown in FIG. 2. The spring clip 28 includes two arms 30, 32 which engage opposite sides of a groove 34 which extends circumferentially around the end portion 18 of the piston rod 20 to prevent the mount 24 from moving in either axial direction relative to the piston rod 20 but to permit the lever assembly to rotate on the piston rod about the axis 86.

The spring clip 28 is retained to the mount 24 by the washer 38 and the snap ring 40, thereby preventing separation of the spring clip 28 from the mount 24 so that the spring clip will not be inadvertently misplaced. As normally supplied, the lever assembly 10 includes the spring clip held in position by the snap ring 40. When the lever assembly 10 is to be attached to the piston rod 20, the spring clip 28 is grasped by its upturned end portion 42 and pulled in the direction shown by the arrow 44 in FIG. 2. This permits the end portion 18 of the piston rod 20 to be inserted through the hole 26. An enlarged cut-out area 46 between the arms 30, 32 of the spring clip 28 permits the spring clip to be moved in the direction indicated. After the end portion 18 of the piston rod 20 has been inserted through the hole 26, the spring clip 28 is pushed in a direction opposite that indicated by the arrow 44 so as to cause the arms 30, 32 to lockingly engage the groove 34. Thus, it is seen that installation of the control mechanism is accomplished without the use of tools, and by simply pushing the spring clip 28 into locking engagement with the groove 34.

The lever assembly 10 further includes an output lever 48 pivotably connected to the mount 24 by a pin 50. The output lever includes a portion 52 which contacts the end of the operating rod 54 to push it into the piston rod 20 to release the hydraulic locking device 22.

The output lever 48 includes a socket 56 for retaining a ball 58 which is swaged to the end of the cable 14. When the cable 14 is drawn in the direction indicated in FIG. 1, the output lever 48 is pivoted in the direction shown causing the portion 52 to push the operating rod 54 into the piston rod 20 to release the hydraulic locking device. The output lever 48 is a lever of the third class and is used to provide a mechanical advantage so that the force exerted on the operating rod 54 is appreciably greater than the tension in the cable 14. A return spring 60 is mounted between the output lever 48 and the mount 24 and urges them apart so that the output lever 48 will be returned to its initial position when the push button is released.

The push button assembly 12 is connected to the conduit 16 and engages the cable 14. The push button assembly 12 includes the push button 62, a plunger 64, a crank 66 and a frame 68. The crank 66 is pivotally mounted to the frame 68 and includes a socket 70 for retaining a ball 72 which is swaged to the end of the cable 14. When the push button 62 is moved in the direction indicated, the plunger 64 pushes the crank 66 to pivot in the direction shown, drawing the cable 14 in the direction indicated. In one embodiment, the push button assembly 12 is mounted to a portion 74 of the arm of a seat (not shown) and thus is located remotely from the lever assembly 10 and the hydraulic locking device 22.

The lever assembly 10 and the push button assembly 12 are assembled and interconnected by the cable 14 and the conduit 16 before the lever assembly 10 is fastened to the piston rod 20.

From the above discussion of the push button assembly 12, it is clear that as the push button 62 is pressed, the socket 70 is moved through a range of positions. If the control mechanism is to function properly, the ball 72 must be positioned along the cable 14 at the particular location which will permit the ball 72 to remain seated in the socket 70 as the crank 66 pivots. However, the present invention takes into account the fact that it is not always possible to swage the ball 72 to the cable 14 at precisely the right location along the cable. In the present invention, inaccuracies in positioning the ball 72 along the cable 14 can be compensated by a simple adjustment.

In a preferred embodiment of the present invention the adjustment is accomplished by use of the threaded collar 76 which connects the conduit 16 to the mount 24. In a preferred embodiment, the threaded collar 76 has a hexagonal outer surface 78 and is threaded on its inner surface. In a preferred embodiment, the threaded collar 76 extends through a hole 80 in the mount 24 and is retained therein by the snap ring 40 and the flange 82 of the threaded collar. The conduit 16 includes a portion 84 affixed to the proximal end of it and threaded on its outer surface. The snap ring 40 engages a groove extending circumferentially around the end of the threaded collar 76 and thus permits the threaded collar 76 to be rotated by hand or with a wrench while the conduit 16 and the mount 24 remain stationary. Such rotation causes the portion 84 to advance within the threaded collar 76 thereby effectively altering the length of the conduit, which may be regarded as including the threaded collar 76.

If, during assembly of the control mechanism, the length of the cable between the ball 58 and the ball 72 is appreciably too long, the push button 62 may bottom out against the frame 68 before the ball 72 has reached the end of its desired stroke. In such a situation, the output lever 48 may not be moved sufficiently to push the operating rod 54 to the release position. On the other hand, if the length of the cable 14 included between the ball 58 and the ball 72 is appreciably too short, it may be impossible for the output lever 48 to move sufficiently far away from the mount 24 to permit the operating rod 54 from emerging from the piston rod 20, thereby preventing the hydraulic locking device from completely locking. Both of the situations are remedied during assembly of the control mechanism by use of the adjustment capability provided by the threaded collar 76.

As shown in FIG. 1, when the threaded collar 76 is in its normal position fully inserted into the hole 80, the snap ring 40 is not flush with the mount 24, but instead is spaced from it by the washer 38 and the spring clip 28.

In a preferred embodiment, the spring clip 28 in its unmounted condition has an upwardly arched portion 29, as shown in FIG. 3. When the spring clip 28 is pushed toward the piston rod to engage the groove 34, the arched portion 29 of the spring clip 28 is wedged under the snap ring 40. The elastic restoring forces in the spring clip 28 urge the threaded collar 76 into the hole 80 more forcefully, so that the flange 82 of the threaded collar is forced against the mount 24. This greatly increases the static friction between the flange 82 and the mount 24 to the point that it becomes impossible to turn the threaded collar 76 by hand. Thus, pushing the arched spring into engagement with the groove 34 simultaneously sets the threaded collar 76 against casual turning. The threaded collar can be turned by hand only when the spring clip 28 has been pulled in the direction indicated by the arrow 44 so that it no longer engages the groove 34.

The foregoing detailed description is illustrative of a preferred embodiment of the invention, and it is to be understood that additional embodiments thereof will be obvious to those skilled in the art. These additional embodiments are considered to be within the scope of the invention.

What is claimed is:

1. A control mechanism for use with a hydraulic device employed to control relative movement between two members, said hydraulic locking device including a hydraulic cylinder connected to one of the members, a piston rod extending outwardly through one end of the hydraulic cylinder to an exposed end of the piston rod and connected to the other of the two members, and an operating rod operative when moved to a release position with respect to the piston rod to release the hydraulic locking device so it can be reset to alter the separation between the two members, said control mechanism comprising in combination:

- a conduit having a proximal end associated with the piston rod and having a distal end;
- a cable extending through said conduit, slidable within it, and including a proximal end and a distal end;
- push button means affixed to the distal end of said conduit for moving said cable under control of an operator through a stroke with respect to said conduit;
- lever means affixed to the piston rod, connected to the proximal end of said conduit, coupled to the proximal end of said cable and responsive to movement of said cable to move the operating rod to the release position with respect to the piston rod, the movement of the operating rod being less than the movement of said push button means to achieve a mechanical advantage;
- a spring clip secured to said lever means and retaining said lever means to the exposed end portion of the piston rod to permit said lever means to be attached to the piston rod without the use of tools;
- a ball affixed to said cable and pivotably and removably engaging said lever means to avoid bending of the cable as said lever means is moved and to facilitate disengagement of said cable from said lever means when said cable is cut;
- said conduit further comprising a threaded collar connecting the proximal end of said conduit to said lever means for altering the length of the conduit under control of an operator to preset the positions of the distal end of the cable at the beginning and the end of the stroke, with respect to the distal end of said conduit;
- said spring clip slidably mounted on said lever means to permit an operator selectively to slide said spring clip from a first position in which said spring clip engages said piston rod for retaining thereto said lever means to a second position in which said spring clip does not engage said piston rod, said spring clip shaped to urge in the first position frictional engagement of said threaded collar with said lever means to prevent rotation of said threaded collar, and shaped to release said threaded collar when moved to said second position, to permit rotation of said threaded collar for altering the length of the conduit.

* * * * *